(12) United States Patent
Rose et al.

(10) Patent No.: US 11,360,520 B2
(45) Date of Patent: Jun. 14, 2022

(54) COMPUTING SYSTEM WITH KEYBOARD STAND

(71) Applicant: Lenovo (Singapore) Pte. Ltd., Singapore (SG)

(72) Inventors: Alden Rose, Durham, NC (US); Dhruvi Suresh Fulfagar, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/915,869

(22) Filed: Jun. 29, 2020

(65) Prior Publication Data
US 2021/0405694 A1 Dec. 30, 2021

(51) Int. Cl.
*G06F 1/16* (2006.01)

(52) U.S. Cl.
CPC .......... *G06F 1/1667* (2013.01); *G06F 1/1643* (2013.01); *G06F 1/1654* (2013.01); *G06F 1/1656* (2013.01); *G06F 1/1669* (2013.01)

(58) Field of Classification Search
CPC .... G06F 1/1654; G06F 1/1669; G06F 1/1618; G06F 1/1643; G06F 1/1656; G06F 1/1635; G06F 1/1632; G06F 1/166; G06F 1/1667
See application file for complete search history.

(56) References Cited

U.S. PATENT DOCUMENTS

| | | | |
|---|---|---|---|
| 8,599,542 B1* | 12/2013 | Healey | G06F 1/1626 361/679.17 |
| 9,436,229 B2* | 9/2016 | Yoo | G06F 1/1667 |
| 9,600,034 B2* | 3/2017 | Kiple | G06F 1/1679 |
| 9,904,315 B2* | 2/2018 | Zhang | G06F 1/1626 361/679.17 |
| 2010/0053876 A1* | 3/2010 | Widmer | G06F 1/1632 361/679.27 |

OTHER PUBLICATIONS

Bohn, D., Google Pixel C Review: Too Clever by Half, The Verge, Dec. 8, 2015 (9 pages).
IFIXIT, Google Pixel C Teardown, May 18, 2016 (23 pages).

* cited by examiner

*Primary Examiner* — James Wu
(74) *Attorney, Agent, or Firm* — Brian J. Pangrle

(57) ABSTRACT

A system can include a display housing that includes a display on a display side, and an opposing, back side; a keyboard housing that includes a keyboard portion that includes a keyboard, a stand portion, and a hinge assembly that rotatably couples the keyboard portion and the stand portion; a stand portion and back side contact orientation, where the stand portion forms a non-planar angle with the keyboard portion and contacts the back side of the display housing to support the display housing at the non-planar angle with the keyboard portion; and a keyboard portion and back side contact orientation, where the keyboard portion is non-planar with the stand portion and contacts the back side of the display housing to support the display housing at one of two different angles.

20 Claims, 11 Drawing Sheets

COMPUTING SYSTEM WITH KEYBOARD STAND

TECHNICAL FIELD

Subject matter disclosed herein generally relates to technology for computing systems.

BACKGROUND

Various types of display devices, display systems, computing systems with a display, etc., exist that can be utilized in various environments.

SUMMARY

A system can include a display housing that includes a display on a display side, and an opposing, back side; a keyboard housing that includes a keyboard portion that includes a keyboard, a stand portion, and a hinge assembly that rotatably couples the keyboard portion and the stand portion; a stand portion and back side contact orientation, where the stand portion forms a non-planar angle with the keyboard portion and contacts the back side of the display housing to support the display housing at the non-planar angle with the keyboard portion; and a keyboard portion and back side contact orientation, where the keyboard portion is non-planar with the stand portion and contacts the back side of the display housing to support the display housing at one of two different angles. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
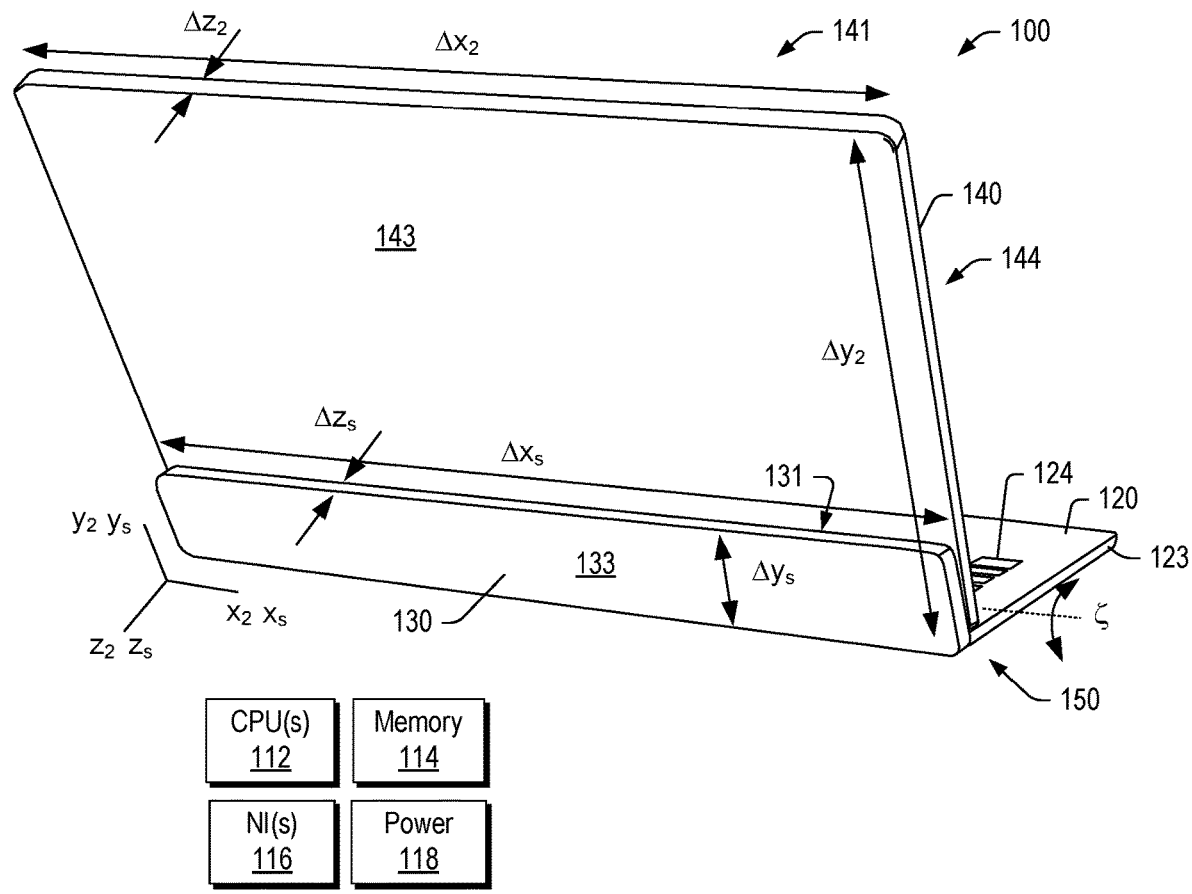
FIG. 1 is a diagram of an example of a system.
Figure 3:
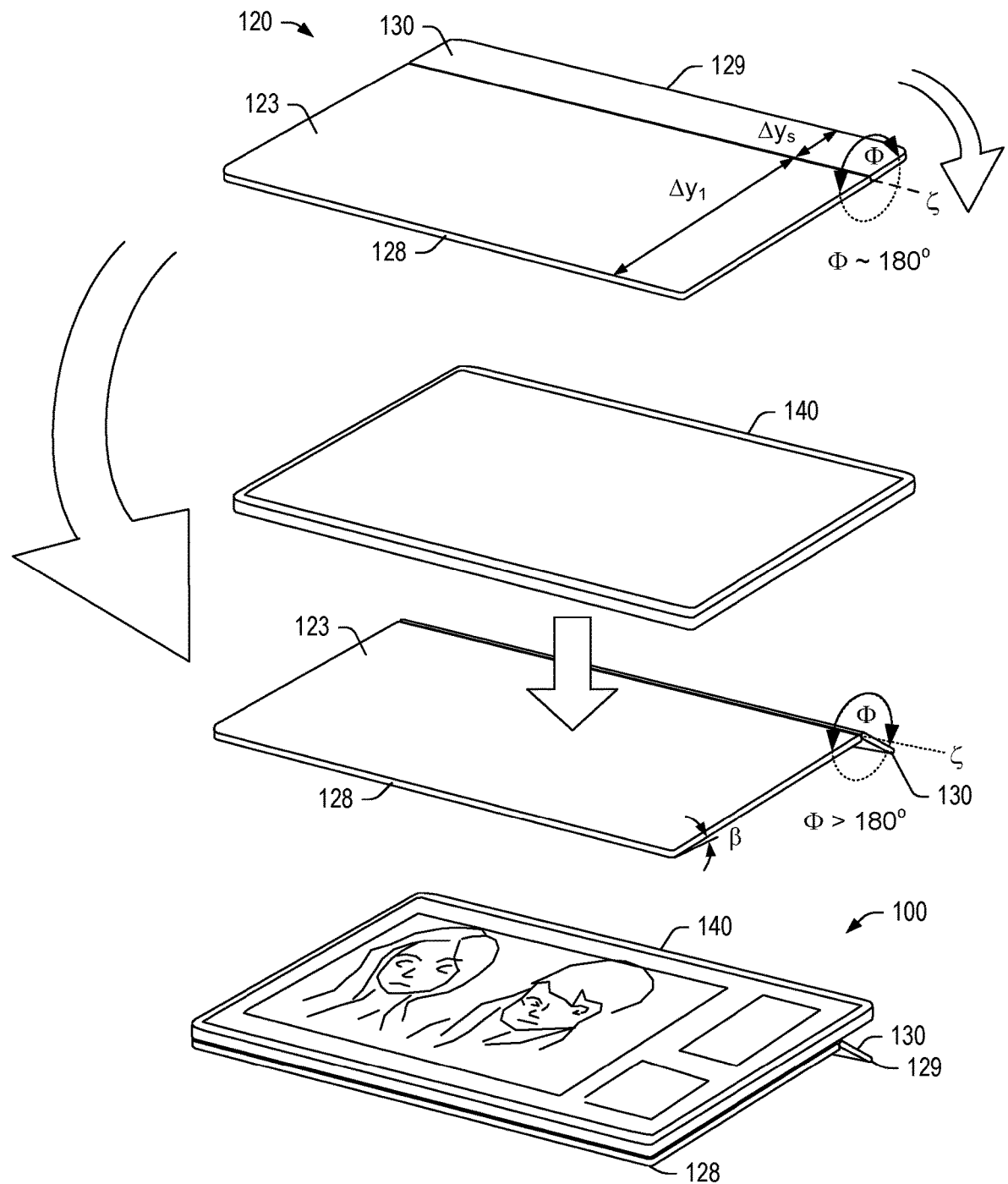
FIG. 3 is a series of diagrams of an example of a method and an example of a system.
Figure 4:
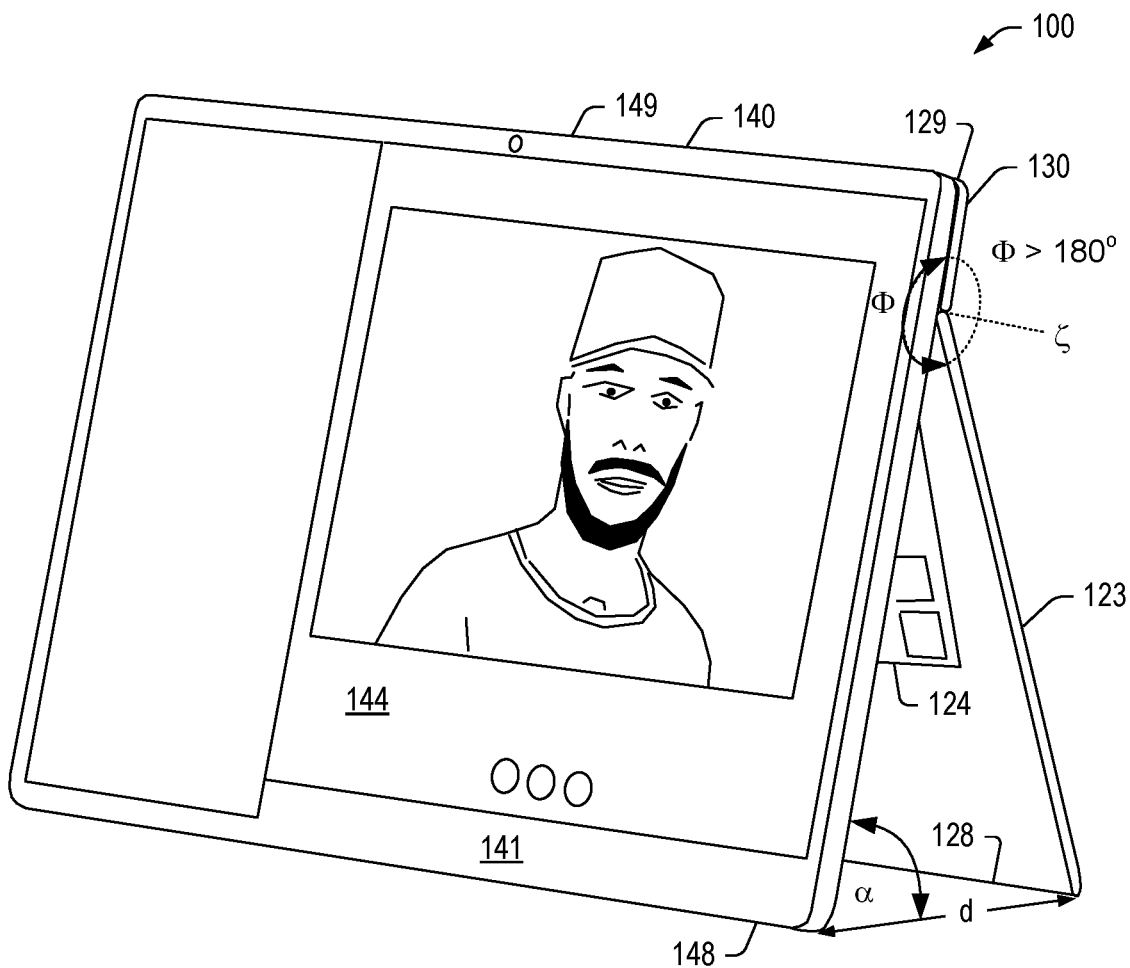
FIG. 4 is a diagram of an example of a system.
Figure 9:
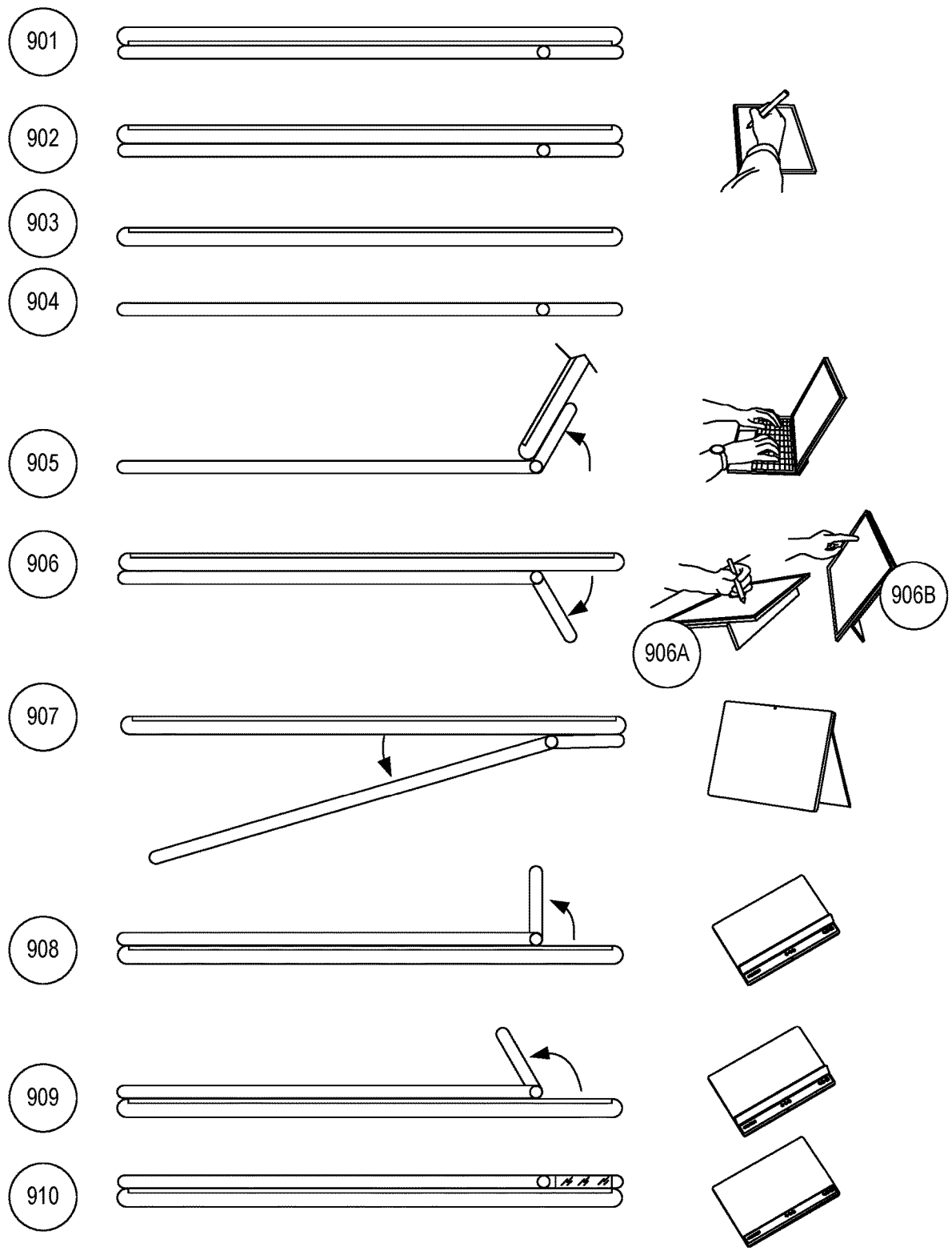
FIG. 9 is a series of diagrams of examples of system orientations.

FIG. 1 shows a system 100 that includes a display housing 140 that includes a display 144 on a display side 141 and an opposing, back side 143; a keyboard housing 120 that includes a keyboard portion 123 that includes a keyboard 124, a stand portion 130, and a hinge assembly 150 that rotatably couples the keyboard portion 123 and the stand portion 130; a stand portion and back side contact orientation, where the stand portion 130 forms a non-planar angle with the keyboard portion 123 and contacts the back side 143 of the display housing 140 to support the display housing 140 at the non-planar angle with the keyboard portion 123 (e.g., as shown in FIG. 1); and a keyboard portion and back side contact orientation, where the keyboard portion 123 is non-planar with the stand portion 130 and contacts the back side 143 of the display housing 140 to support the display housing 140 at one of two different angles (see, e.g., FIG. 3, FIG. 4, and FIG. 9, orientations 906A and 906B).

In the example of FIG. 1, the hinge assembly 150 rotatably couples the keyboard portion 123 and the stand portion 130 for rotation about a rotational axis C. A hinge assembly may include one or more hinges, one or more axles, one or more leaves, one or more gears, etc. For example, consider a single axle hinge that includes a leaf that couples to the keyboard portion 123 and a leaf that couples to the stand portion 130. As another example, consider a multi-axle hinge that can include gears where axles rotate in unison via meshed engagement of gears.

As an example, the system 100 may include one or more processors 112, memory 114 (e.g., one or more memory devices), one or more network interfaces 116, and one or more power cells 118. Such components may be, for example, housed in one or more of the keyboard housing 120 and the display housing 140.

The system 100 can include one or more power cells, such as, for example, one or more rechargeable batteries (e.g., lithium-ion based, etc.). As an example, the system 100 may include charging circuitry that provides for charging of a rechargeable battery of one or more components, portions, etc. In such an example, the charging circuitry may be wired and/or wireless (e.g., consider antenna based charging circuitry, which may adhere to the Qi standard that defines wireless power transfer using inductive charging over distances that may range up to 4 cm or more).

As an example, the system 100 can include one or more interfaces that provides for one or more of power transfer and data transfer, for example, between the keyboard housing 120 and the display housing 140. As an example, compatible interfaces may operate via wireless transfer of data, for example, consider one or more of WiFi, LiFi, Bluetooth, etc.

Figure 2:
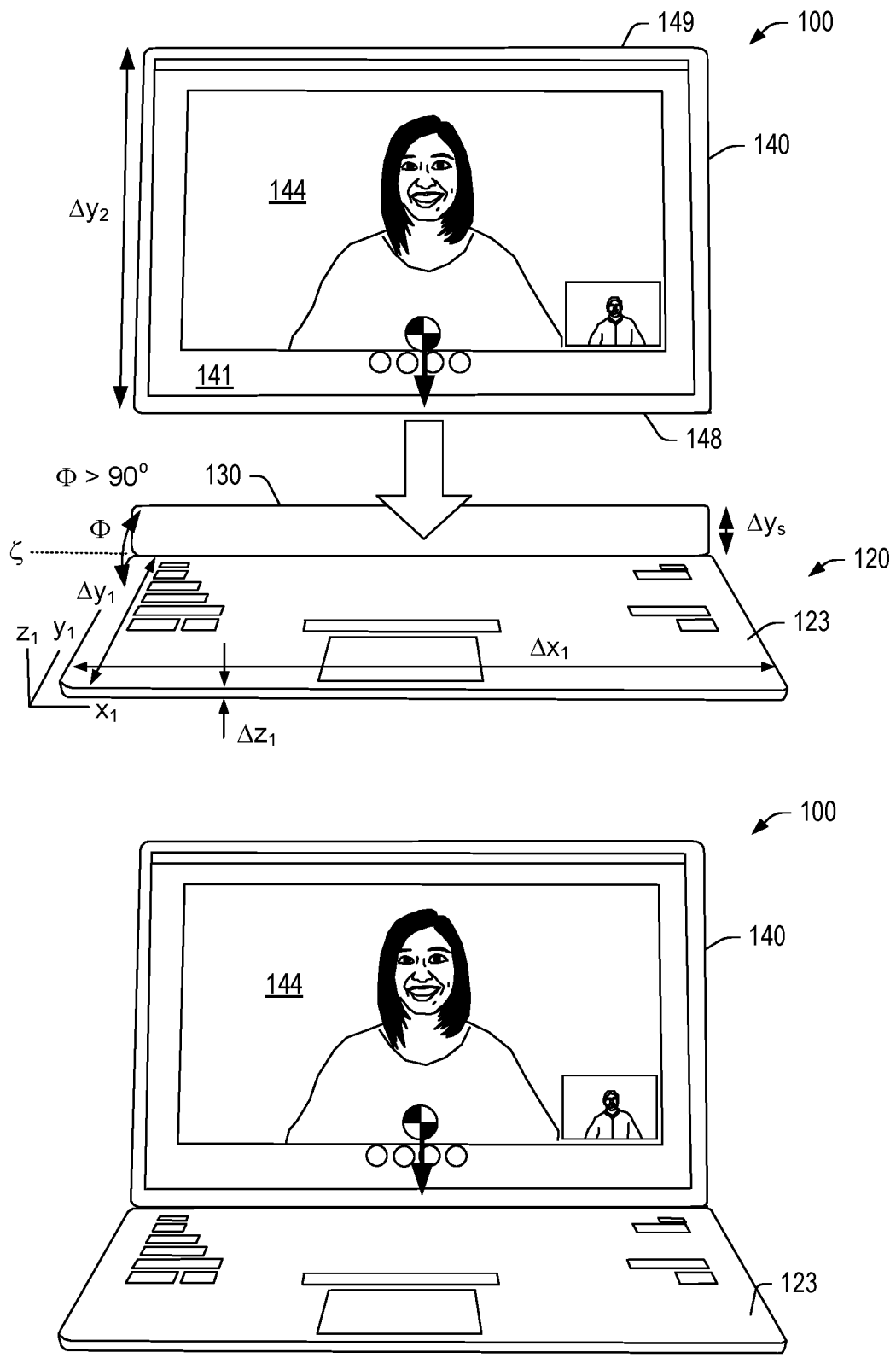
FIG. 2 is a series of diagrams of an example of a method and an example of a system.

In the example of FIG. 1, various dimensions are shown with respect to a Cartesian coordinate system ($x_2$, $y_2$, $z_2$) for the display housing 140 and a Cartesian coordinate system for the stand portion 130; noting that a similar Cartesian coordinate system ($x_s$, $y_s$, $z_s$) may be utilized for the keyboard portion and/or the keyboard housing 120 (see, e.g., Cartesian coordinate system ($x_1$, $y_1$, $z_1$) of FIG. 2). As shown, the axis $x_2$ can be utilized to define a width $\Delta x_2$, the axis $y_2$ can be utilized to define a depth $\Delta y_2$, and the axis $z_2$ can be utilized to define a thickness $\Delta z_2$. The dimensions $\Delta x_2$ and $\Delta y_2$ can define an area, for example, a surface area of the back side 143 of the display housing 140 (e.g., $a_2 = \Delta x_2 * \Delta y_2$) and the dimensions $\Delta x_s$ and $\Delta y_s$ can define an area, for example, a surface area of a back side 133 of the stand portion 130 (e.g., $a_s = \Delta x_s * \Delta y_s$. Such areas can be substantially the same as those of the front side 141 of the display housing 141 and a front side 131 of the stand portion 130.

As an example, one or more magnets may be utilized to provide a magnetic attraction force, which may act to retain a physical connection between the stand portion 130 and the display housing 140. In such an example, the magnetic attraction force may be overcome, for example, via a user contacting the stand portion 130 and/or the display housing 140 and applying force to physically separate the stand portion 130 and the display housing 140.

In the example of FIG. 1, the hinge assembly 150 can provide a force sufficient to prevent the stand portion 130 for undesirable movement, for example, due to gravity acting upon a mass of the display housing 140 (e.g., and a mass of the stand portion 130). For example, a mass of the display housing 140 may have a center (e.g., center of mass) that is a distance from the axis that results in a torque thereabout. In such an example, the hinge assembly 150 may utilize one or more of friction, ratcheting, stops, etc., to counteract a gravity related torque of the display housing 140, for example, whether the keyboard portion 123 is horizontal or at an angle due to the keyboard portion 123 being supported on a user's legs (e.g., on the user's lap).

As an example, the hinge assembly 150 may be a friction hinge assembly that includes an axle in a barrel where frictional force between surfaces may provide for maintaining a desired rotational position. As an example, a friction hinge assembly may include one or more components that are adjustable to adjust an amount of friction. For example, consider one or more washers (e.g., cone washers, etc.) that may be utilized to apply force to an axle or another component. In such an example, an axle may be threaded over an end portion where a nut can be loosened or tightened where tightening may compress components to increase frictional force. As an example, a single piano type hinge may be utilized or multiple hinges may be utilized. As an example, a hinge assembly may include a locking mechanism that allows a user to lock a hinge assembly at a desired position. For example, consider a quick-release mechanism such as a quick-release skewer, a seatpost type of clamp, etc. A quick release skewer can include a rod threaded on one end and with a lever operated cam assembly on the other. The rod may be inserted into a hollow axle where a nut is threaded on, and the lever is closed to tighten the cam. Such an assembly may allow for locking in a hinge assembly in a desired position.

The system 100 can be a detachable laptop form-factor system with an adjustable and repositionable keyboard housing. Such a system can provide for various angles of a display housing, which may be for different tasks, types of ergonomic interactions, etc. The system 100 may be readily transitioned from one orientation to another orientation. As explained, the hinge assembly 150 can provide for adjusting the stand portion 130 to an angle selected from multiple angles, which can be within a range of angles that include an angle of approximately 180 degrees such that the stand portion 130 is co-planar with the keyboard portion 120.

As an example, the keyboard housing 120 can couple to the display housing 140 in multiple manners to provide for multiple orientations of the system 100. The keyboard housing 120 can be a hard-shelled, hinged housing and the display housing can be a hard-shelled, unhinged housing. In a closed clamshell orientation of the system 100, the keyboard 124 of the keyboard housing 120 and the display 144 of the display housing 140 can face each other where the housings 120 and 140 can be held together using a magnetic attraction force.

As an example, the display housing 140 can include various types of circuitry, power components, etc. As explained, wireless charging circuitry may be included in the system 100. For example, consider the display housing 140 including wireless charging circuitry that can transfer energy to wireless charging circuitry of the keyboard housing 120 to wirelessly charge one or more batteries of the keyboard housing 120.

As explained, the keyboard housing 120 is detachable from the display housing 140 and includes the stand portion 130, which is hinged to a keyboard portion 123. As an example, the stand portion 130 may rotate using the hinge assembly 150 by approximately 360 degrees or a lesser range that includes a 180 degree orientation.

The system 100 can include various orientations, which may be accompanied by one or more operational modes. For example, consider a laptop mode of an open laptop orientation (e.g., for typing and viewing content), which can be achieved by attaching a portion of the display housing 140 to the stand portion 130 and then rotating the stand portion 130 to a desired angle. As another example, consider a slate mode (e.g., for drawing or notetaking), which can be achieved by attaching the keyboard portion 123 to the back side 143 of the display housing 140 and rotating the stand portion 130 away from the display housing 140 to form a relatively low-angle kick-stand (e.g., using an edge of the stand portion 130). As yet another example, consider a viewing mode (e.g., for content presentation or consumption), which can be achieved by attaching the keyboard portion 123 to the back side 143 of the display housing 140 and rotating the keyboard portion 123 away from the display housing 140 to form a high-angle kick-stand (e.g., using an edge of the keyboard portion 123).

As an example, when in a closed clamshell (e.g., closed laptop) orientation, the stand portion 130 may provide for viewing of content rendered to a portion of the display 144 of the display housing 140. For example, consider rotating the stand portion 130 away from the display 144 to reveal a portion of the display 144. As another example, consider a cutout or portal in the stand portion 130 through which a portion of the display 144 is viewable. As yet another example, consider the stand portion 130 including a translucent material of a region or regions through which a portion or portions of the display 144 is or are viewable. In such an example, a translucent material can be less than 99.999 percent transparent.

As an example, the stand portion 130 can include a recess for storage of a stylus. In such an example, the recess may be accessible from the front side 131 or from the back side 133 of the stand portion 130. Where the recess is open on the front side 131 only, when the system 100 is in a closed clamshell orientation, the recess may be sealed as the display housing 140 can cover the recess to help maintain a stylus in the recess. Where a stylus is not utilized, it may also be sealed in the recess in the laptop orientation shown in FIG. 1. For example, a stylus may be sealed between the back side 133 of the stand portion 130 and the back side 143 of the display housing 140.

FIG. 2 shows an example of a method for transitioning the system 100 from a first orientation to a second orientation. FIG. 2 shows the Cartesian coordinate system $(x_1, y_1, z_1)$ for the keyboard housing 120 where a sum of $\Delta y_1$ and $\Delta y_s$ is substantially equal to $\Delta y_2$. For example, if $\Delta y_2$ is 25 cm, then the sum of $\Delta y_1$ and $\Delta y_s$ can be 24 cm to 26 cm. For example, an overall depth of a display housing and an overall depth of a keyboard housing can be within +/−5 percent of each other.

In such an example, a footprint of the keyboard housing 120 and a footprint of the display housing 140 can be substantially equal.

As mentioned, the display housing 140 can include one or more batteries and a center of mass. In such an example, the center of mass may be closer to one edge of the display housing 140 than an opposing edge. In such an example, the center of mass may be closer to the one edge due to position of the one or more batteries being closer to the one edge than the opposing edge. As an example, the display housing 140 can include an edge that is a dedicated downward edge for a laptop orientation. In such an example, where the center of mass of the display housing 140 is closer to that edge, torque due to lever arm length and mass may be reduced when compared to a longer lever arm length that may be at a geometric center of the display housing 140. Further, where a user holds the display housing 140 as a tablet (e.g., a slate) in one hand, the hand may hold the display housing 140 from the side that corresponds to the edge to which the center of mass is closer. In the example of FIG. 2, a center of mass symbol is shown, which is positioned closer to an edge 148 than to an opposing edge 149. Where a user holds the display housing 140 near the center of mass (e.g., from the side with the edge 148), the ergonomic balance in the user's hand may be better than if the user held the display housing 140 from the opposing side (e.g., from the side with the edge 148). As explained, a center of mass that is off-center can be utilized to improve stability in the laptop orientation as shown in FIG. 2 and in a hand held orientation.

FIG. 3 shows an example of a method for transitioning the system 100 from a first orientation to a second orientation. As shown, the keyboard housing 120 can define a plane where the keyboard portion 123 and the stand portion 130 are co-planar and an angle Φ is approximately 180 degrees. As shown, the stand portion 130 may be rotated to an increased angle that is greater than 180 degrees with respect to the keyboard portion 123. The display housing 140 can be positioned with respect to the keyboard housing 120 such that the display 144 can be at an angle β with respect to a support surface (e.g., a desktop, a tabletop, a countertop, etc.). In the example of FIG. 3, a triangle may be formed between a front edge 128 of the keyboard housing 120, a back edge 129 of the keyboard housing 120 and the axis ζ. In such an example, the angle β can be an internal angle where another internal angle can be approximately 360 degrees minus Φ and where the remaining internal angle can be defined as 180 degrees minus the other two internal angles. As shown, one leg is defined by the keyboard portion 123 while another leg is defined by the stand portion 130. In the example of FIG. 3, the keyboard portion 123 forms a support platform for supporting the display housing 140 at the angle β.

FIG. 4 shows an example orientation of the system 100 where the stand portion 130 is coupled to the back side 143 of the display housing 140 to provide for viewing of the display 144 at an angle α defined with respect to a support surface or a line between the edge 148 and the edge 128. The angle α may be an adjustable angle or may be a set angle. In the example of FIG. 4, a distance d is shown as a distance between the edge 148 of the display housing 140 and the edge 128 of the keyboard housing 120, which is an edge of the keyboard portion 123 of the keyboard housing 120.

As shown in the example of FIG. 4, the angle Φ is greater than 180 degrees where the keyboard 124 is facing the back side 143 of the display housing 140. As an example, where orientations include an orientation where the keyboard 124 faces outwardly away from the back side 143 of the display housing 140, the angle Φ may be less than 180 degree while still achieving an angle such as the angle α. For example, the back side 133 of the stand portion 130 may contact the back side 143 of the display housing 140 and/or the front side 131 of the stand portion 130 may contact the back side 143 of the display housing 140 to provide for a tent-like orientation of the display housing 140 as shown in FIG. 4. As an example, a magnet or magnets can be included in the system 100 that provide for one or more types of orientations. As an example, the system 100 can include ferromagnetic material that can be attracted to a magnet or magnets such that one or more types of orientations may be formed.

Figure 5:
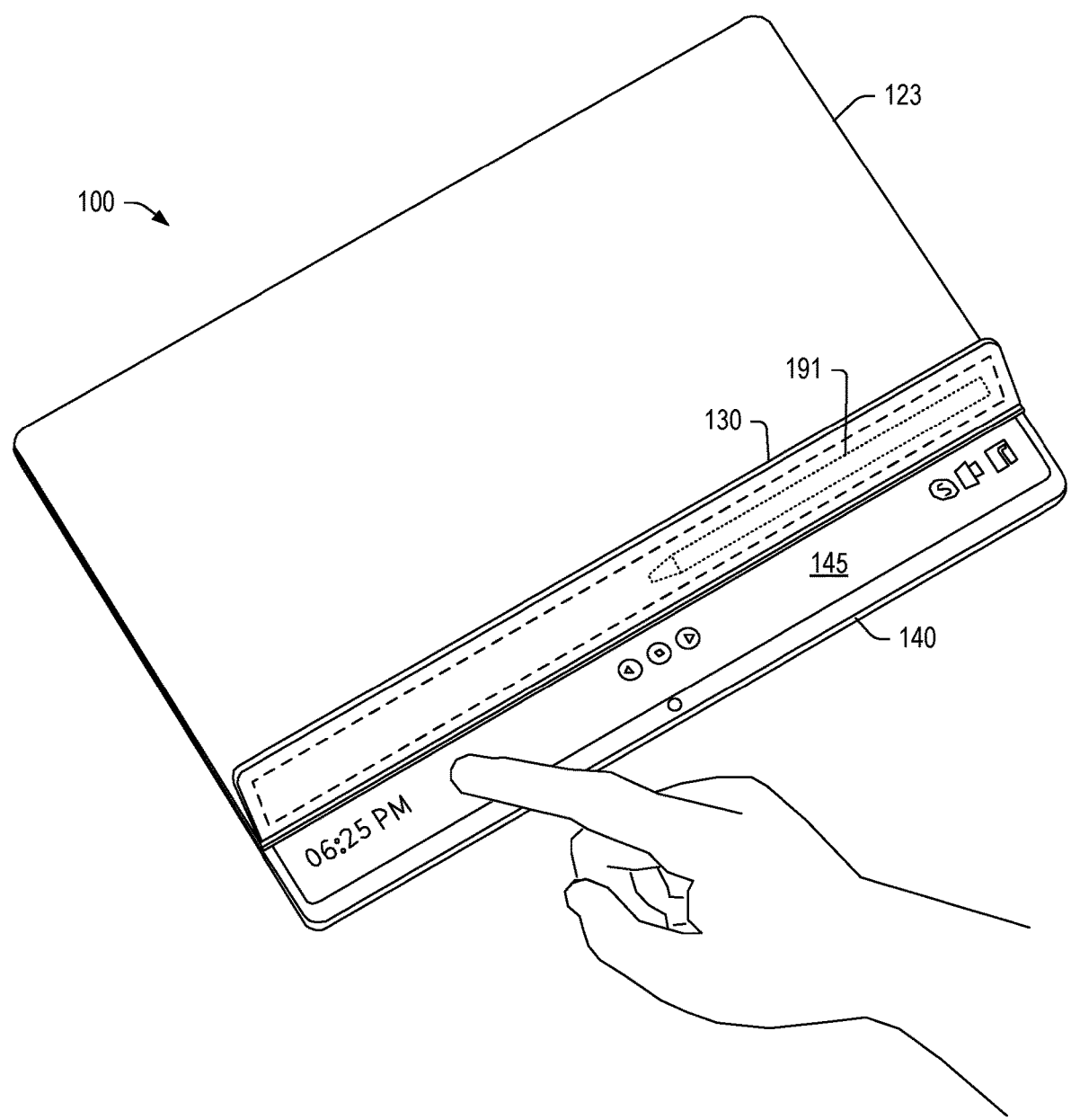
FIG. 5 is a diagram of an example of a system.

FIG. 5 shows an example orientation of the system 100 where the stand portion 130 of the keyboard housing 120 is rotated away from a portion 145 of the display 144 of the display housing 140 to expose the portion 145 of the display 144 of the display housing 140. As shown, various types of content may be rendered to the portion 145 of the display 144, which may be a touchscreen display that include touch sensitive circuitry (e.g., capacitive, resistive, etc.) that can register touch input. As an example, the system 100 can include one or more speakers and/or audio circuitry that can operatively couple to one or more speakers for rendering of media. In such an example, the portion 145 of the display 144 may include one or more graphical user interfaces (GUIs) that can control playing of media, etc. As an example, the portion 145 of the display 144 may be utilized for rendering emails, messages, alarms, time, etc.

As an example, content rendered to the portion 145 of the display 144 may include equipment information, which may include power status (e.g., battery charge level, power state, etc.), network status (e.g., WiFi connection, cellular connection, etc.), etc. As an example, display housing 140 may render information to the portion 145 of the display 144 responsive to receipt of information via one or more interfaces. For example, consider receipt of an email, a network call, a message, an alarm, etc.

In the example of FIG. 5, a dashed line is shown on the front side 131 of the stand portion 130, which may be a boundary of a touch sensitive region where, for example, touch input can be received for controlling one or more actions of the system 100. For example, consider the touch sensitive region being a gesture input region where a swipe may act to scroll content on the portion 145 of the display 144, to increase and/or decrease volume of media being played, to increase and/or decrease brightness of the display 144, etc. As an example, a user may view one or more types of content, GUIs, etc., on the portion 145 of the display 144 while entering touch input via the front side 131 of the stand portion 130.

As an example, the stand portion 130 may include a stylus sensitive surface such that input can be provided using a stylus. As mentioned, the stand portion 130 can include a recess for a stylus. In the example of FIG. 5, a dotted line indicates a stylus and/or a recess for a stylus. As an example, the portion 145 of the display 144 may include circuitry that can receive stylus input.

Figure 6:
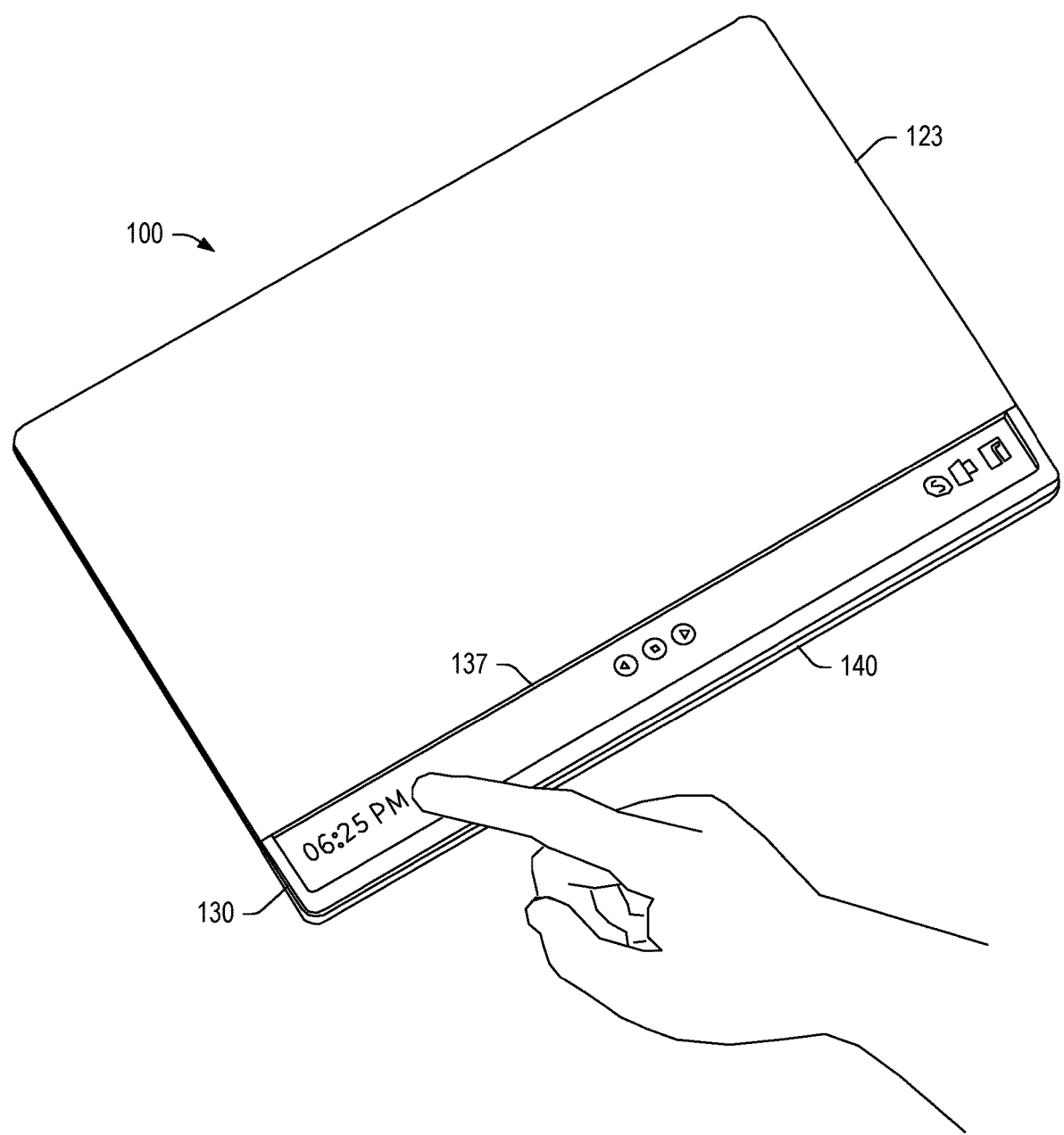
FIG. 6 is a diagram of an example of a system.

FIG. 6 shows an example orientation of the system 100 where the stand portion 130 of the keyboard housing 120 is not rotated away from the portion 145 of the display 144 of the display housing 140 and where the portion 145 of the display 144 of the display housing 140 is visible. In the example of FIG. 6, the portion 145 can be visible due to the stand portion 130 including a window 137, which may be a translucent material window with a translucent material pane or the window 137 may be an open window without a pane. As mentioned, a translucent material can be less than 99.999 percent transparent.

Figure 7:
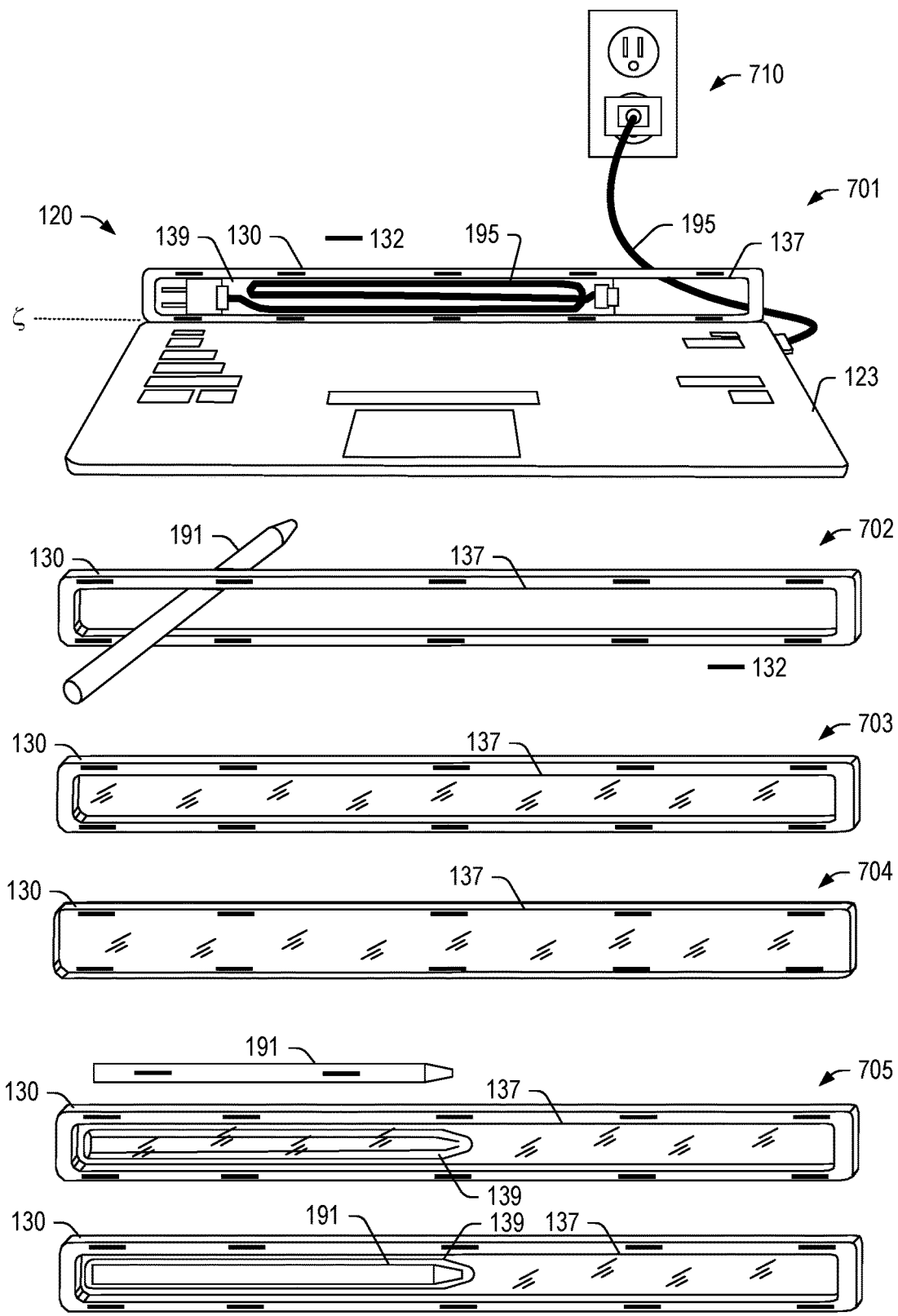
FIG. 7 is a series of diagrams of examples of stand portions.

FIG. 7 shows various examples 701, 702, 703, 704 and 705 of the stand portion 130 of the keyboard housing 120.

The example 701 shows the stand portion 130 as including a recess 139 that can be a cable recess. For example, a cable 195 is shown in a stored state in the recess 139 and in an unstored state where it can be connected to one or more objects. For example, consider a cable that can connect to one or more of the display housing 140, the keyboard housing 120, a peripheral, a power outlet 710, etc. For example, consider a user deploying the cable 195 to charge a battery or batteries of the display housing 140 and/or to charge a battery or batteries of the keyboard housing 120. As an example, a cable may be for wired connection of the display housing 140 and the keyboard housing 120, which may be for transfer of data, transfer of power, etc. Such an approach may be a secure approach where, for example, wireless transmission is not permitted and/or otherwise not possible (e.g., due to noise, etc.). As an example, a cable can include one or more serial bus connectors (e.g., USB, etc.), one or more power connectors (e.g., a power outlet connector), one or more voltage conversion circuits, etc.

The example 701 also shows examples of magnets at examples of magnet locations. A magnet may be a bar magnet, a circular magnet, etc. A magnet may be positioned for an attraction force on one side or on both sides of a component (e.g., a display housing, a stand portion, a keyboard portion, etc.).

As an example, a cable can include one or more magnets and/or one or more ferromagnetic materials that can help to position and secure the cable in a recess of the stand portion 130.

In FIG. 7, the example 702 shows an open window 137 along with examples of magnets 132 where the stand portion 130 includes a frame that defines and surrounds the open window 137 and where, for sake of illustration, a stylus 191 is shown as passing through the open window 137.

In FIG. 7, the example 703 shows a translucent pane window 137 along with examples of magnets 132 where the stand portion 130 includes a frame that defines and surrounds the translucent pane window 137.

In FIG. 7, the example 704 shows a translucent material that makes the stand portion 132 an edge to edge window 137, where magnets 132 may be disposed on or within the translucent material.

In FIG. 7, the example 705 shows a stylus recess 139 that can removably receive the stylus 191 where the stylus recess 139 may be within a translucent window material, within an opaque material, accessible from the front side 131 and/or the back side 133 of the stand portion 130, etc.

As an example, where the stand portion 130 includes the open window 137 as in the example 702, it may be utilized to pass one or more finger therethrough or at least partially into the open window 137. Such an approach may provide for carrying the keyboard housing 120 as a separate component of the system 100.

Figure 8:
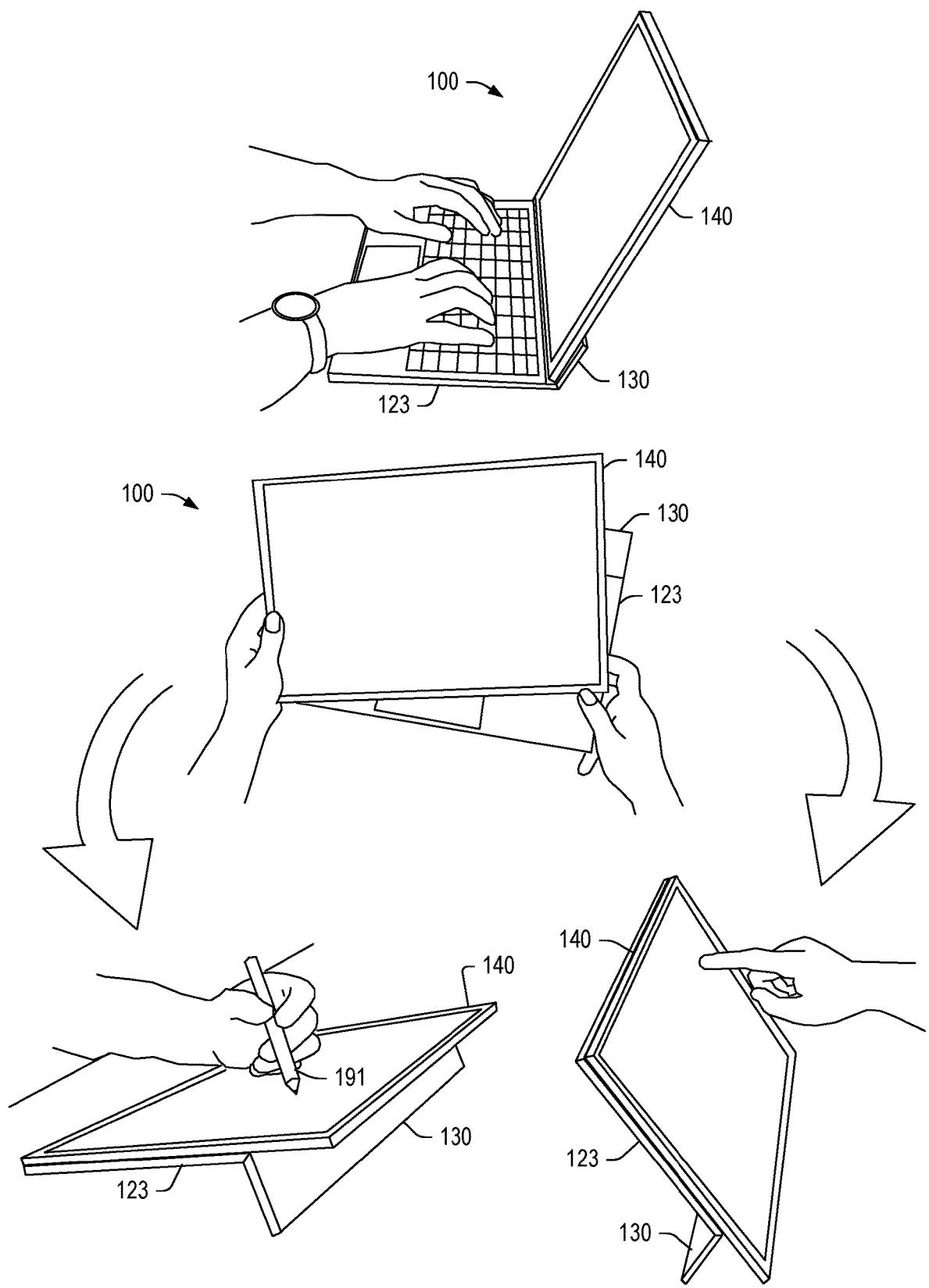
FIG. 8 is a series of diagrams of an example of a method and an example of a system.

FIG. 8 shows an example of a method for transitioning the system 100 from a first orientation to a second orientation or a third orientation. As an example, the stand portion 130 may be disposed at a common angle in the first orientation, the second orientation and the third orientation. In such an example, the transition from the first orientation involves repositioning of the display housing 140 with respect to the keyboard housing 120, optionally without adjusting an angle of the stand portion 130 with respect to the keyboard portion 123.

FIG. 9 shows example orientations, labeled 901 to 910 where orientation 906 includes orientations 906A and 906B. In FIG. 9, the orientation 901 is a closed clamshell orientation, the orientation 902 is a stacked tablet orientation, the orientation 903 is a separated tablet orientation, the orientation 940 is a wireless mobile keyboard orientation, the orientation 905 is a laptop orientation, the orientation 906 is a drawing orientation as shown in the orientation 906A or a display orientation as shown in the orientation 906B, the orientation 907 is a display orientation, the orientation 908 is a peek orientation, the orientation 909 is a peek and power state switching orientation, and the orientation 910 is a see through orientation.

As shown, the orientation 909 may be an orientation where rotation of the stand portion 130 can cause switching of the system 100 or a portion thereof to a different power state.

Figure 10:
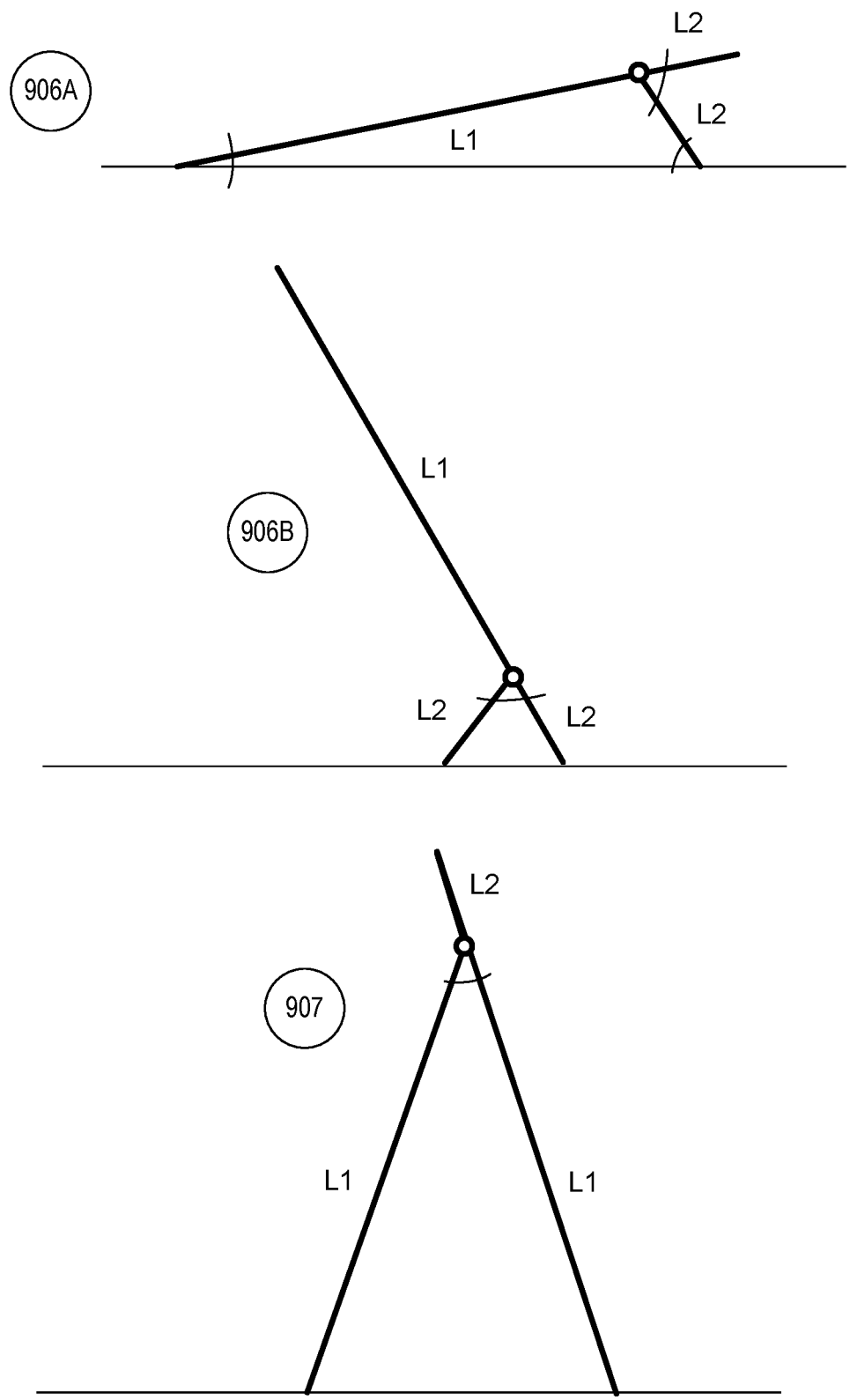
FIG. 10 is a series of diagrams of examples of system dimensions.

FIG. 10 shows example dimensions and angles for several of the example orientations of FIG. 9. Specifically, lengths L1 and L2 are shown for the orientations 906A, 906B and 907. As shown, in the orientation 906A, the lengths L1 and L2 define support legs of a triangle while, in the orientation 906B, the length L2 defines support legs of a triangle, and, in the orientation 907, the length L1 defines support legs of a triangle. As an example, a total length can be a sum of L1 and L2. As shown, the length L2 is less than L1. As an example, the length L2 can be less than 50 percent of L1. As an example, the length L2 can be less than one-third of L1. As an example, the length L2 can be less than 30 percent of L1. As an example, the length L2 can be approximately 25 percent of L1 or less.

As an example, the system 100 can include one or more types of operating systems, for example, consider a MICROSOFT WINDOWS OS, an APPLE MAC OS, a net OS, a CHROME OS, an ANDROID OS, etc. As an example, the system 100 may include cellular technology such as one or more cellular network circuits (e.g., 5G circuitry, etc.).

As an example, a system can include a display housing that includes a display on a display side, and an opposing, back side; a keyboard housing that includes a keyboard portion that includes a keyboard, a stand portion, and a hinge assembly that rotatably couples the keyboard portion and the stand portion; a stand portion and back side contact orientation, where the stand portion forms a non-planar angle with the keyboard portion and contacts the back side of the display housing to support the display housing at the non-planar angle with the keyboard portion (see, e.g., the orientation 905 of FIG. 9); and a keyboard portion and back side contact orientation, where the keyboard portion is non-planar with the stand portion and contacts the back side of the display housing to support the display housing at one of two different angles (see, e.g., the orientations 906A and 906B of FIG. 9). In such an example, the system may include another stand portion and back side contact orientation, where the stand portion contacts the back side of the display housing to support the display housing at an angle (see, e.g., the orientation 907 of FIG. 9) and/or the system may include a keyboard portion and display side contact orientation, where the keyboard portion forms a non-planar angle with the stand portion and contacts the display side of the display housing to cover a portion of the display (see, e.g., the orientations 908 and 909 of FIG. 9).

As an example, a system can include a stand portion that includes a translucent material where, in a stand portion and display side contact orientation, a display is visible through the translucent material (see, e.g., the orientation 910 of FIG. 9).

As an example, a keyboard housing can include wireless communication and a display housing can include wireless communication circuitry where, for example, keyboard circuitry of the keyboard housing and display circuitry of the display housing are operatively coupled via the wireless communication circuitry of the keyboard housing and the wireless communication circuitry of the display housing.

As an example, keyboard circuitry of a keyboard housing may be operable independent of display circuitry of the display housing (see, e.g., the orientation 904 of FIG. 9). In such an example, display circuitry of the display housing may be operable independent of keyboard circuitry of the keyboard housing (see, e.g., the orientation 903 of FIG. 9).

As an example, a system can include a closed orientation where a keyboard portion and a stand portion contact a display side of a display housing to cover a display (see, e.g., the orientation 901 of FIG. 9).

As an example, a system can include a stacked tablet orientation where a keyboard portion and a stand portion contact a back side of a display housing (see, e.g., the orientation 902 of FIG. 9).

As an example, a display housing can include touch input circuitry and/or a stand portion can include touch input circuitry.

As an example, a keyboard housing can include at least one battery and, for example, a display housing can include at least one battery.

As an example, a stand portion can include a magnet and a display housing can include a magnet where, for example, in a stand portion and back side contact orientation, the magnets attract to support the display housing at a non-planar angle with a keyboard portion.

As an example, a keyboard portion can include a magnet and a display housing can include a magnet where, for example, in a keyboard portion and back side contact orientation, the magnets attract to support the display housing at one of two different angles.

As an example, a system can include a keyboard portion that defines a first length and a stand portion defines a second length, where two different angles correspond to a first angle defined by a triangle that includes a leg of the first length and a leg of the second length and a second angle defined by a triangle that includes two legs of the second length (see, e.g., the lengths L1 and L2 of FIG. 10).

As an example, a keyboard portion of a system can define a length, where an angle corresponds to an angle defined by a triangle that includes two legs of the length (see, e.g., the length L2 of FIG. 10).

As an example, a system can include a processor and memory accessible to the processor, where a display is operatively coupled to the processor. For example, consider operating the processor where, in response thereto, information may be rendered to the display. As an example, where the display is a touchscreen display (e.g., with touch input circuitry), touch input may be utilized to instruct the processor, which, in turn, may cause rendering of information to the display.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 11:
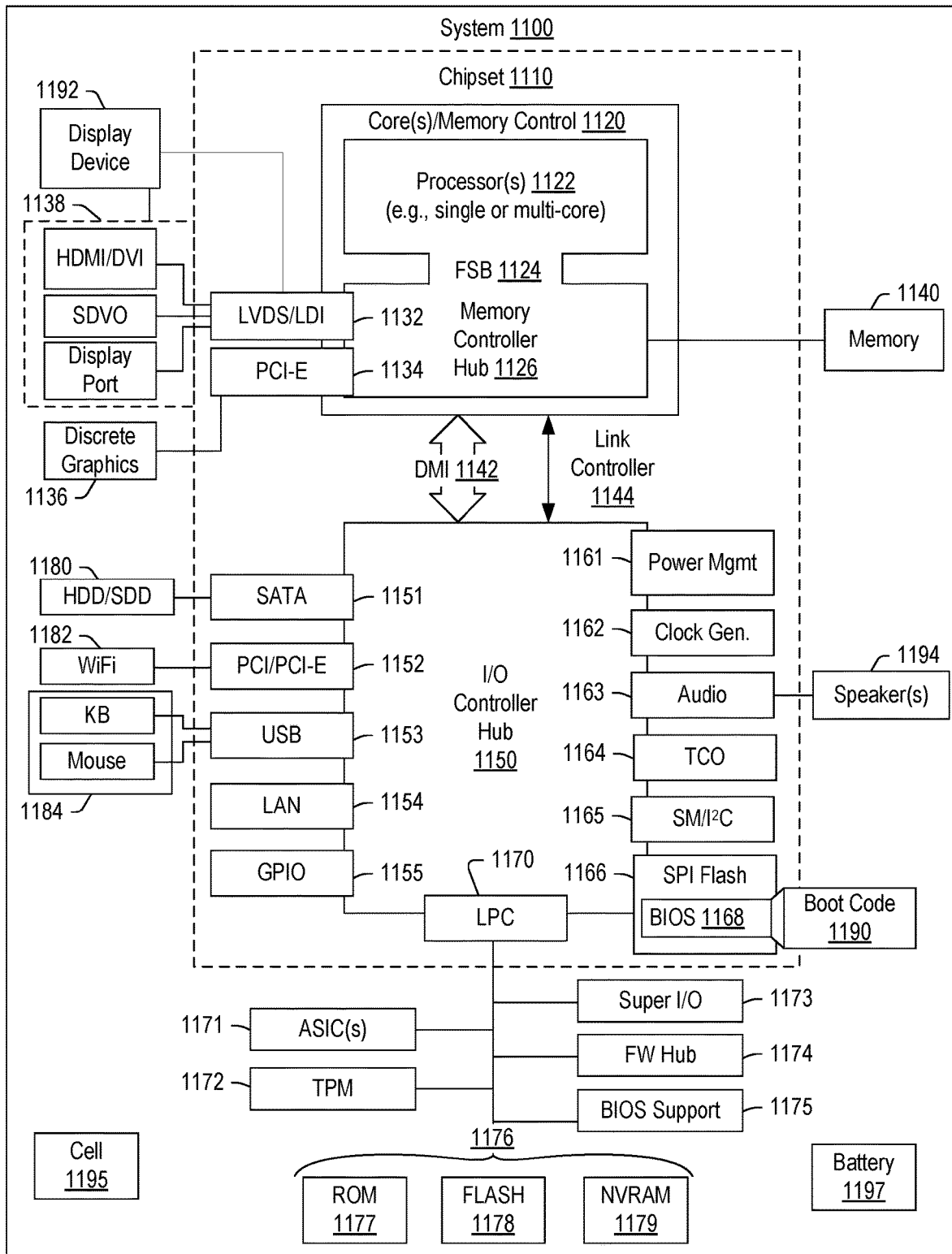
FIG. 11 is a diagram of an example of a system that includes one or more processors.

While various examples of circuits or circuitry have been discussed, FIG. 11 depicts a block diagram of an illustrative computer system 1100. The system 1100 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1100. As an example, a system such as the system 100 of FIG. 1 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a keyboard housing that comprises a keyboard portion of a first length (L1) that comprises a keyboard, a stand portion of a second length (L2), and a hinge assembly that rotatably couples the keyboard portion and the stand portion;
    a display housing that comprises a display on a display side, and an opposing, back side, wherein the display housing has a display housing length that is a sum of the first length (L1) and the second length (L2);
    a stand portion and back side contact orientation, wherein the stand portion, via the hinge assembly, forms a non-planar angle with the keyboard portion and wherein the stand portion contacts the back side of the display housing to support the display housing at the non-planar angle with the keyboard portion; and
    a keyboard portion and back side contact orientation, wherein the keyboard portion, via the hinge assembly, forms a non-planar angle with the stand portion, and wherein the keyboard portion of the first length (L1) contacts a portion of the back side of the display housing of the first length (L1) to support the display housing at one of two different angles on a planar support surface,
    wherein the two different angles correspond to
        a first angle defined by the first length (L1) of the keyboard portion, the second length (L2) of the stand portion and an edge of the keyboard portion and an edge of the stand portion that provide for contact with the planar support surface, and
        a second angle defined by the second length (L2) of the stand portion, a portion of the display housing of the second length (L2) and an edge of the stand portion and an edge of the display housing that provide for contact with the planar support surface.

2. The system of claim 1, comprising another stand portion and back side contact orientation, wherein the stand portion of the second length (L2) contacts a portion of the back side of the display housing of the second length (L2) to support the display housing at a third angle, defined by the first length (L1) of the keyboard portion and a portion of the display housing of the first length (L1), wherein an edge of the keyboard portion and an edge of the display housing provide for contact with the planar support surface.

3. The system of claim 1, comprising a keyboard portion and display side contact orientation, wherein the keyboard portion forms a non-planar angle with the stand portion and contacts the display side of the display housing to cover a portion of the display.

4. The system of claim 1, wherein the stand portion comprises a translucent material and wherein, in a stand portion and display side contact orientation, the display is visible through the translucent material.

5. The system of claim 1, wherein the keyboard housing comprises wireless communication and the display housing comprises wireless communication circuitry.

6. The system of claim 5, wherein keyboard circuitry of the keyboard housing and display circuitry of the display housing are operatively coupled via the wireless communication circuitry of the keyboard housing and the wireless communication circuitry of the display housing.

7. The system of claim 1, wherein keyboard circuitry of the keyboard housing is operable with another system independent of display circuitry of the display housing.

8. The system of claim 7, wherein display circuitry of the display housing is operable independent of keyboard circuitry of the keyboard housing.

9. The system of claim 1, comprising a closed orientation wherein the keyboard portion and the stand portion contact the display side of the display housing to cover the display.

10. The system of claim 1, comprising a stacked tablet orientation wherein the keyboard portion and the stand portion contact the back side of the display housing.

11. The system of claim 1, wherein the display housing comprises touch input circuitry.

12. The system of claim 1, wherein the stand portion comprises touch input circuitry.

13. The system of claim 1, wherein the keyboard housing comprises at least one battery and wherein the display housing comprises at least one battery.

14. The system of claim 1, wherein the stand portion comprises a magnet and wherein the display housing comprises a magnet.

15. The system of claim 14, wherein, in the stand portion and back side contact orientation, the magnets attract to support the display housing at the non-planar angle with the keyboard portion.

16. The system of claim 1, wherein the keyboard portion comprises a magnet and the display housing comprises a magnet.

17. The system of claim 16, wherein, in the keyboard portion and back side contact orientation, the magnets attract to support the display housing at the one of the two different angles.

18. The system of claim 1, comprising a processor and memory accessible to the processor, wherein the display is operatively coupled to the processor.

19. A system comprising:
a display housing that comprises a display on a display side, and an opposing, back side;
a keyboard housing that comprises a keyboard portion that comprises a keyboard, a stand portion, and a hinge assembly that rotatably couples the keyboard portion and the stand portion;
a stand portion and back side contact orientation, wherein the stand portion forms a non-planar angle with the keyboard portion and contacts the back side of the display housing to support the display housing at the non-planar angle with the keyboard portion and wherein the stand portion comprises a translucent material and wherein, in a stand portion and display side contact orientation, the display is visible through the translucent material; and
a keyboard portion and back side contact orientation, wherein the keyboard portion is non-planar with the stand portion and contacts the back side of the display housing to support the display housing at one of two different angles.

20. A system comprising:
a display housing that comprises a display on a display side, and an opposing, back side;
a keyboard housing that comprises a keyboard portion that comprises a keyboard, a stand portion, and a hinge assembly that rotatably couples the keyboard portion and the stand portion;
a stand portion and back side contact orientation, wherein the stand portion forms a non-planar angle with the keyboard portion and contacts the back side of the display housing to support the display housing at the non-planar angle with the keyboard portion and wherein the stand portion comprises touch input circuitry; and
a keyboard portion and back side contact orientation, wherein the keyboard portion is non-planar with the stand portion and contacts the back side of the display housing to support the display housing at one of two different angles.

* * * * *